United States Patent

Girdzijauskas et al.

(10) Patent No.: US 9,451,233 B2
(45) Date of Patent: Sep. 20, 2016

(54) METHODS AND ARRANGEMENTS FOR 3D SCENE REPRESENTATION

(75) Inventors: Ivana Girdzijauskas, Kista (SE); Markus Flierl, Taby (SE); Apostolos Georgakis, Stockholm (SE); Pravin Kumar Rana, Solna (SE); Thomas Rusert, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 854 days.

(21) Appl. No.: 13/640,722

(22) PCT Filed: Nov. 24, 2010

(86) PCT No.: PCT/SE2010/051294
§ 371 (c)(1),
(2), (4) Date: Oct. 11, 2012

(87) PCT Pub. No.: WO2011/129735
PCT Pub. Date: Oct. 20, 2011

(65) Prior Publication Data
US 2013/0027523 A1    Jan. 31, 2013

Related U.S. Application Data

(60) Provisional application No. 61/323,904, filed on Apr. 14, 2010.

(51) Int. Cl.
H04N 13/00 (2006.01)
(52) U.S. Cl.
CPC .................... H04N 13/0022 (2013.01)
(58) Field of Classification Search
CPC .................................... H04N 13/0022
USPC .......................................... 348/48
See application file for complete search history.

(56) References Cited

U.S. PATENT DOCUMENTS 7,031,512 B2 *  4/2006  Ng ..................... G06K 9/20
                                                 345/422
8,471,848 B2 *  6/2013  Tschesnok ........ G06T 7/0067
                                                 345/419

(Continued)

FOREIGN PATENT DOCUMENTS

WO         03036992 A1     5/2003

OTHER PUBLICATIONS

Liu et al. "A Point-Cloud-Based Multiview Stereo Algorithm for Free-Viewpoint Video" IEEE Transactions on Visualization and Computer Graphics, vol. 16(3):407-418, May/Jun. 2010.

(Continued)

*Primary Examiner* — Tung Vo
*Assistant Examiner* — Rowina Cattungal
(74) *Attorney, Agent, or Firm* — Rothwell, Figg, Ernst & Manbeck, P.C.

(57) ABSTRACT

The embodiments of the present invention relates to a method and a processor for representing a 3D scene. In the method, one 3D component of the 3D scene to be represented, captured at least three different views ($v_1$, $v_2$, $v_3$) is projecting to a predefined view ($v_F$). A value associated with each projected view regarding the 3D component is then determined and consistency among the projected views regarding the 3D component is detected. Moreover, a consistency value regarding the 3D component is determined based on the determined values associated with the respective projected view, and the determined values are replaced by the determined consistency value on at least one of the three projected 3D components.

15 Claims, 10 Drawing Sheets

(56) References Cited

U.S. PATENT DOCUMENTS

| | | | |
|---|---|---|---|
| 2007/0183669 A1* | 8/2007 | Owechko | G06K 9/00369 382/224 |
| 2008/0262345 A1* | 10/2008 | Fichtinger | A61B 6/504 600/426 |
| 2009/0167866 A1* | 7/2009 | Lee | G06K 9/3233 348/159 |
| 2010/0193697 A1 | 8/2010 | Bal et al. | |
| 2011/0122230 A1* | 5/2011 | Boisson | H04N 13/0022 348/47 |

OTHER PUBLICATIONS

Tzovaras et al. "Disparity field and depth map coding for multiview 3D image generation" Signal Processing: Image Communication 11:205-230, 1998.

Supplementary European Search Report dated Jul. 20, 2015, issued in European Patent Application No. 10849941, 2 pages.

Ekmekcioglu et al. "Edge and Motion-Adaptive Median Filtering for Multi-View Depth Map Enhancement" Picture Coding Symposium, 2009, 4 pages.

Um et al. "Three-dimensional Scene Reconstruction Using Multi-view Images and Depth Camera" Proceedings of SPIE—International Society for Optical Engineering, vol. 5664, 2005, pp. 271-280.

Li et al. "The Study of Fault Diagnosis of Condenser Based on the Consensus Information Fusion" Intelligent Computing and Intelligent Systems, ICIS 2009, IEEE, pp. 598-602.

Beaton et al. "RADDACL: A Recursive Algorithm for Clustering and Density Discovery on Non-linearly Separable Data" Proceedings of International Joint Conference on Neural Networks, 2007, pp. 1633-1638.

\* cited by examiner $s_1, s_2, s_3$ and $s_4$ respectively projected to the virtual position $v_F$, represented by $p_1, p_2, p_3$ and $p_4$.

METHODS AND ARRANGEMENTS FOR 3D SCENE REPRESENTATION

CROSS REFERENCE TO RELATED APPLICATION(S)

This application is a 35 U.S.C. §371 National Phase Entry Application from PCT/SE2010/051294, filed Nov. 24, 2010, designating the United States, which application claims the benefit of U.S. Provisional Application No. 61/323,904, filed Apr. 14, 2010. The disclosures of both applications are incorporated herein in their entirety by reference.

TECHNICAL FIELD

The present invention relates to three dimension (3D) scene representations and in particular to a method and an arrangement for providing improved 3D scene representations.

BACKGROUND

The research in 3D has gained considerable momentum in recent years, and there is a lot of interest from industry, academy and consumer society. Several 3D movies are being produced every year, providing compelling stereoscopic effects to its audience. It is however already possible to enjoy 3D experience at home, and in the very near future, mobile phones will be 3D-enabled.

The term 3D is usually connected to stereoscopic experience, where user's eyes are provided with slightly different images of a scene which are fused by the brain to create depth impression. However, there is much more to 3D. For example, free viewpoint television (FTV) is a novel TV system that allows users to have a 3D visual experience while freely changing their position in front of a 3D display. Unlike the typical stereoscopic television, which enables a 3D experience to users that are sitting at a fixed position in front of a screen, FTV allows to observe the scene from many different angles, as if we were there.

The FTV functionality is enabled by multiple components. The 3D scene is captured by many cameras and from different views or angles—the so-called multiview video. Different camera arrangements are possible, depending on the application. For example, it may be as simple as a parallel camera arrangement on a 1D line, whereas in more complex scenarios it may include 2D camera arrays forming an arc structure. Multiview video is almost with no exception considered in combination with other 3D scene components. The main reason for that is the transmission cost of the huge amount of data that the multiview video carries.

Multiview video can be relatively efficiently encoded by exploiting both temporal and spatial similarities that exist in different views. The first version of multiview video coding (MVC) was standardized in July 2008. However, even with MVC, the transmission cost remains prohibitively high. This is why only a subset of the captured multiple views is actually being transmitted. To compensate for the missing information, depth and disparity maps can be used instead. A depth map is a simple greyscale image, wherein each pixel of the map indicates the distance between the corresponding pixel from a video object and the capturing camera. Disparity, on the other hand, is the apparent shift of a pixel which is a consequence of moving from one viewpoint to another. Depth and disparity are mathematically related. The main property of depth/disparity maps is that they contain large smooth surfaces of constant grey levels. This makes them much easier to compress with current video coding technology.

From the multiview video and depth/disparity information it is possible to generate virtual views at an arbitrary viewing position. This can be done by e.g. projection. A view synthesized from texture and depth usually has some pixels unassigned which usually are called holes. This can happen due to rounding errors, and in that case the holes can usually be easily fixed by e.g. median filtering. Another reason is that some pixels/regions in the virtual view may not be visible in the existing view(s) and vice versa. These regions are called either occluded or disoccluded regions respectively. They can be used in addition to texture and depth, to improve the quality of the synthesized view.

The above mentioned 3D components—texture, depth maps, disparity maps, occlusions, are used to enable the FTV functionality. Alternatively, they can be used to build a 3D model of a scene etc. The main problem that arises in practice is that these 3D components are rarely perfectly consistent. For example, the colors in multiview textures can be slightly unbalanced, which may create an annoying stereo impression.

The problem gets even more evident for depth/disparity/occlusion maps, which are usually estimated rather than measured, due to the cost of the measuring equipment. Thus, in addition to inconsistency, these components often suffer from a poor or at least unacceptable quality. There is a wealth of depth/disparity estimation algorithms in the literature, but they still suffer from many problems such as noise, temporal or spatial inconsistency and incapability to estimate depth/disparity for uniform texture regions etc. Even the measured depth maps can be noisy or may fail on dark objects in the scene. This is the problem with infrared cameras for example, where the dark regions absorb most of the light.

It is clear that inconsistent and poor quality 3D scenes create many artifacts in rendered views of a scene, leading to unacceptable quality in 3D experience. For example, using inconsistent depth maps in view synthesis creates ghost images, which are especially visible at object boundaries. This is called ghosting. On the other hand, depth map(s) may be temporally unstable, which leads to flickering in the synthesized view. These are only some of the examples which make the stereo impression annoying.

SUMMARY

The objective of the embodiments of the present invention is to achieve improved methods and arrangements for representing 3D scenes.

This is achieved by combining multiple available 3D components at different views for one 3D representation. These 3D components are exemplified by depth and occlusion information. Also, disparity information can be converted into depth and occlusion information. It should however be noted that the embodiments are not limited to the above mentioned components.

According to a first aspect of the embodiments of the present invention a method in a processor for representing a 3D scene is provided. In the method, one 3D component of the 3D scene to be represented, captured at at least three different views ($v_1$, $v_2$, $v_3$) is projecting to a predefined view ($v_F$). A value associated with each projected view regarding the 3D component is then determined and consistency among the projected views regarding the 3D component is detected. Moreover, a consistency value regarding the 3D component is determined based on the determined values associated with the respective projected view, and the determined value is replaced with the determined consistency value on at least one of the three projected 3D components.

According to a second aspect of embodiments of the present invention, a processor for representing a 3D scene is provided. The processor is configured to project to a predefined view ($v_F$) one 3D component of the 3D scene to be represented, captured at at least three different views ($v_1$, $v_2$, $v_3$). The processor is further configured to determine a value associated with each projected view regarding the 3D component, to detect consistency among the projected views regarding the 3D component, to determine a consistency value regarding the 3D component based on the determined values associated with the respective projected view. Accordingly, the processor is configured to replace the determined value with the determined consistency value on at least one of the three projected 3D components.

An advantage of embodiments of the present invention is that multiple components can be used to improve the quality of one of the existing components. Alternatively, they can be used to create a high quality and reliable estimates at positions where the information is not available (virtual views).

A further advantage with embodiments of the present invention is that a 3D scene component which is improved by the embodiments can be warped backwards to the original viewpoint positions, leading to improved quality and/or more consistent inputs. This leads to higher coding efficiency if the multiple inputs are jointly encoded.

A further advantage is that the solution according to the embodiments can exploit and combine different types of available inputs for example texture and depth information to further improve the quality. Multiple depth/disparity information can be used to improve the texture quality, but the other way round is possible as well.

A further advantage with embodiments of the present invention is that the distance and threshold matrices, as well as the rule how to determine the consistency value can be flexibly modified to adapt to different signal statistics (as is the case with texture and depth/disparity signals).

A yet further advantage is that the method and arrangement of embodiments of the present invention can be flexibly designed to account for spatial and/or temporal redundancies that exist in multiview representations.

DETAILED DESCRIPTION

Figure 1:
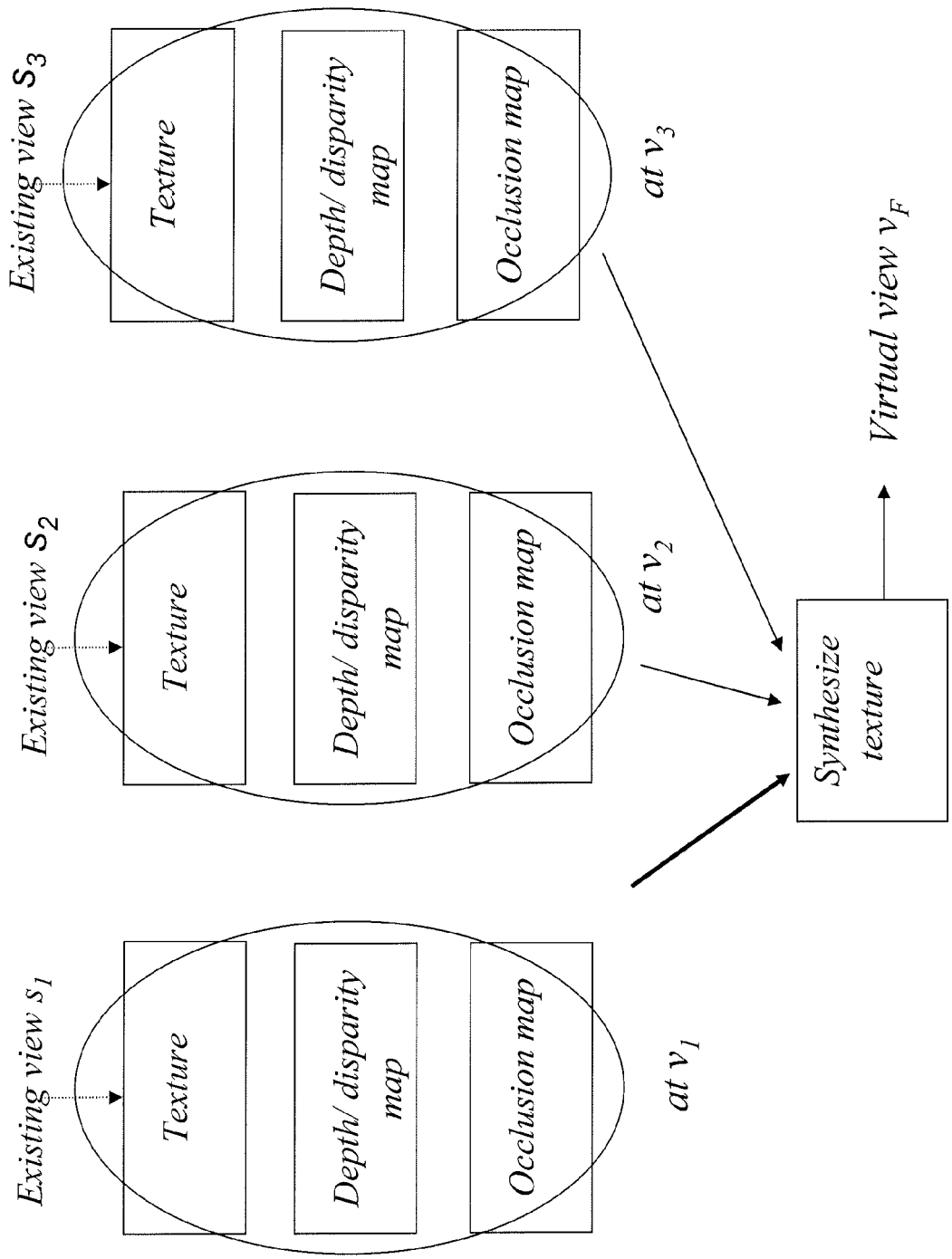
FIG. 1 illustrates a synthesis of virtual views from neighbouring views and the corresponding depth corrected maps according to embodiments of the present invention.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

The embodiments of the present invention relate to multiview alignment for 3D representations, i.e. multiple existing views comprising 3D components are used to synthesize the 3D components at a virtual view. For multiview alignment it is assumed that a given number of 3D components in N existing views: $s_1, \ldots, s_N$ are available where $N \geq 3$, and a 3D component imply texture (image/video), depth (range) data, disparity map, occlusion data or any other form of description for a 3D scene. These existing views, $s_1, \ldots, s_N$, are captured or estimated at various viewpoints $v_1, \ldots, v_N$ in a common local or global coordinate system. It should be noted here that the subscript indices correspond to the distinct positions in this coordinate system.

FIG. 1 depicts a scenario, for the case when 3D components ($s_1$, $s_2$ and $s_3$) at three existing views ($v_1$, $v_2$ and $v_3$) are used to synthesize 3D components at a virtual view. The existing views in FIG. 1 include the 3D components comprising texture, depth and occlusion maps. It should be noted that the virtual view may match one of the existing views. In that case, the multiple 3D scene components are used to improve the quality of existing information.

Figure 2:
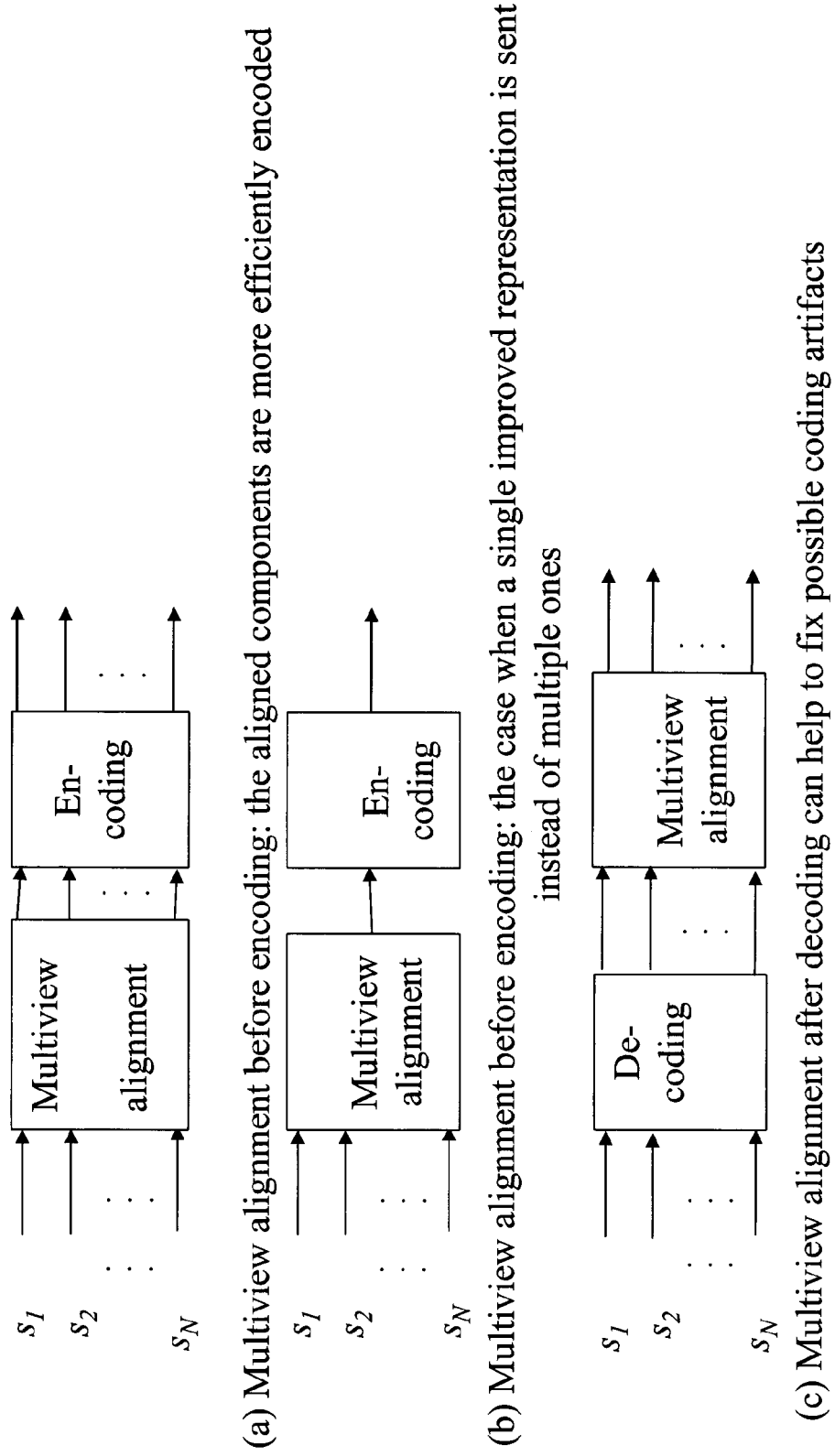
FIG. 2 illustrates multiview alignment on the transmitter and receiver side according to embodiments of the present invention.

As illustrated in FIG. 2, multiview alignment can be performed (a) before encoding, which results in that the aligned components are more efficiently encoded. The multiple representations are sent for encoding. As an alternative, a single improved representation is sent (b) for encoding instead of multiple representations as in FIG. 2(a). Moreover, multiview alignment can also be performed (c) after decoding, which helps to fix possible coding artefacts.

Figure 3:
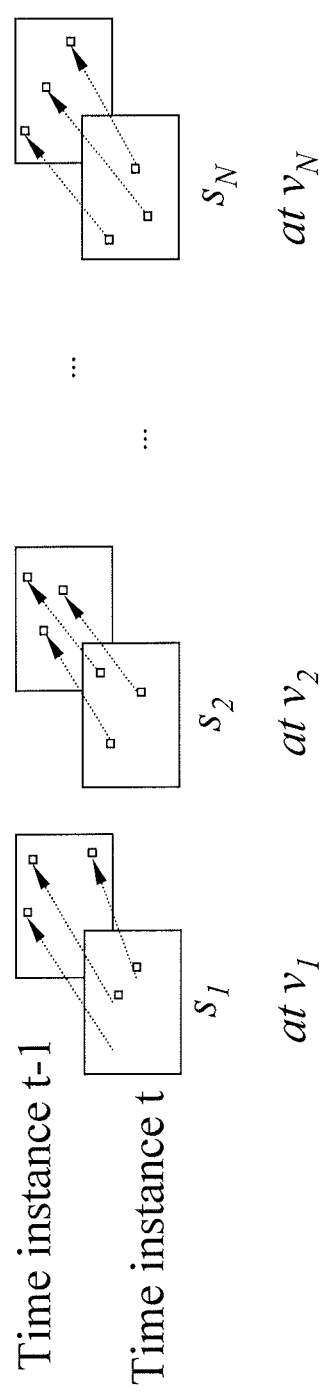
FIG. 3 shows that both $s_1, \ldots, s_N$ and their motion compensated realizations at previous time instances can be taken as inputs for multiview alignment according to embodiments of the present invention.

It is important to stress here that the 3D components $s_1, \ldots, s_N$ captured at $v_1, \ldots, v_N$ may include not only the 3D components which are all captured at the same time instance but they might as well include motion compensated versions of the viewpoints in previous time instance(s). In this way, the temporal dependencies are taken into account, which subsequently leads to reduced flickering artifacts etc. Alternatively, only the parts with no motion can be considered i.e. usually the background, which leads to more stable non-moving regions reconstruction. FIG. 3 illustrates this principle. The arrows in FIG. 3 are motion vectors, which indicate the displacement of blocks between the previous and the current time instance. The information from the previous time instances can therefore provide additional information. This is very important for e.g., depth maps, where each frame is usually estimated independently from previous frames.

The embodiments of the present invention uses information from $s_1$-$s_N$ captured at $v_1, \ldots, v_N$ to extract and/or improve the information at an arbitrary position $v_F$. If $v_F$ corresponds to one of the $v_1$-$v_N$, then the quality of a particular representation using the remaining ones is improved. If this is not the case, then a representation in the new position $v_F$ is simply synthesized. For that information is extracted from all the available inputs $s_1$-$s_N$ by filtering or fusing. Thus, the method according to embodiments of the present invention has the freedom of picking an arbitrary point in space.

Figure 4:
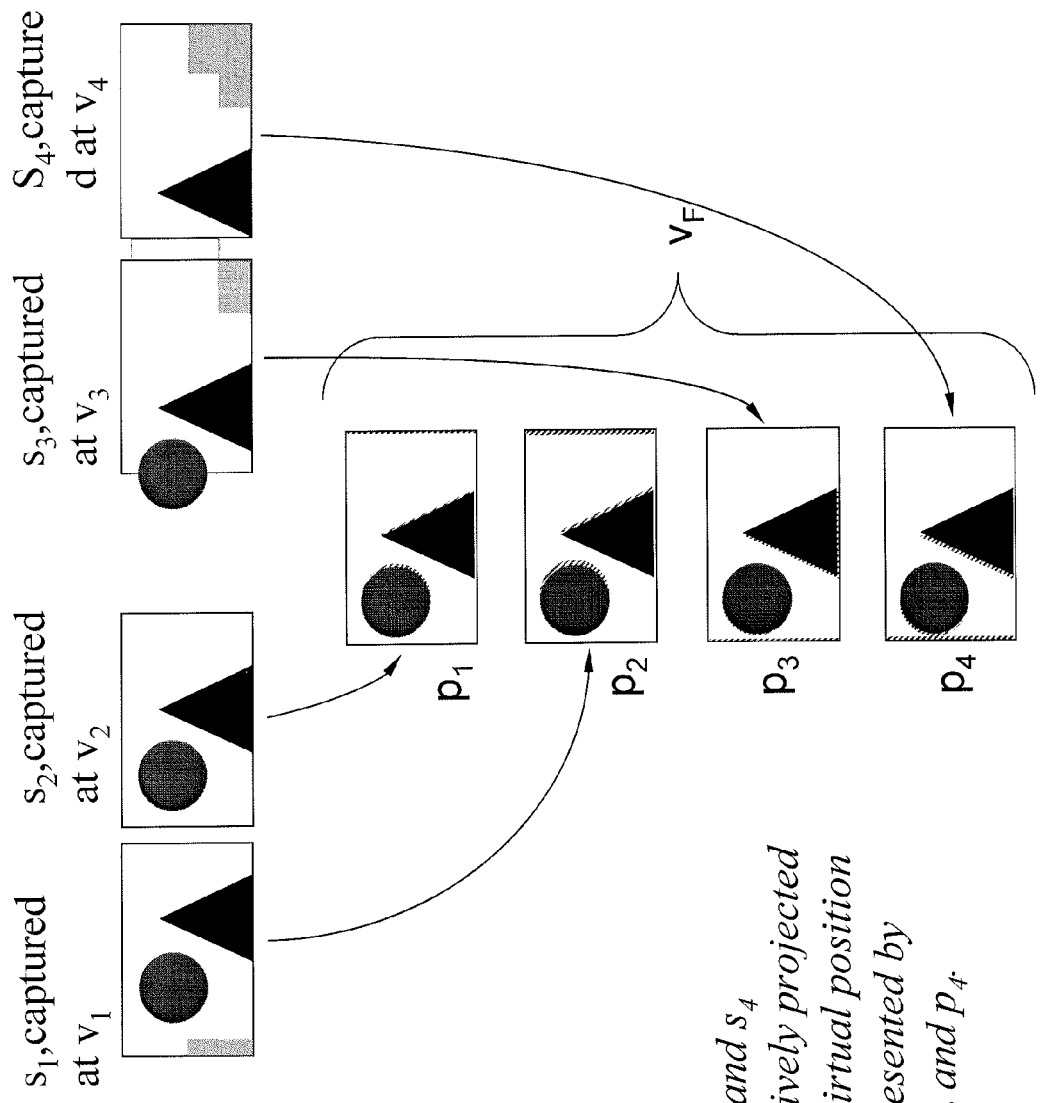
FIG. 4 illustrates projecting of multiple 3D scenes to a virtual position according to embodiments of the present invention.
Figure 10:
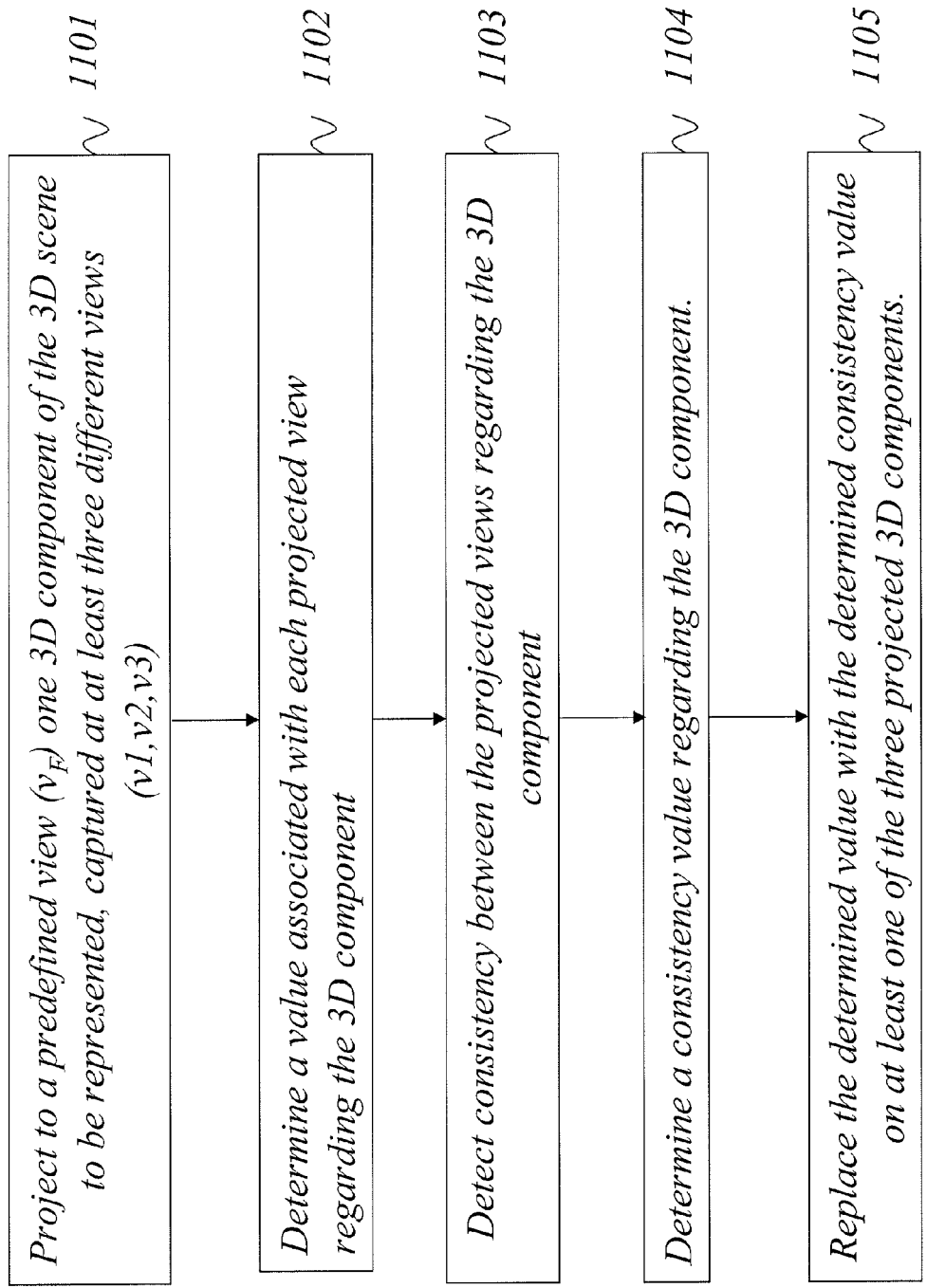
FIG. 10 is a flowchart of a method according to embodiments of the present invention.

In the first step 1101 as shown in the flowchart of FIG. 10, 3D components $s_1, \ldots, s_N$ respectively captured at $v_1, \ldots, v_N$ are projected to a position $v_F$ as illustrated in FIG. 4. That results in the projected representations of the 3D components denoted by $p_1, \ldots, p_N$. This can be done, for example, with an image warping algorithm. Then the $p_1, \ldots, p_N$ are segmented into blocks. In the simplest case, a block may contain a single pixel, but groups of pixels, regular square or rectangular blocks, irregular areas such as superpixels, foreground/background objects, etc are also envisaged. The segmentation depends on the type of input, the complexity restrictions, the need to preserve some local structure properties, etc.

Because the inputs $s_1$-$s_N$ are not perfect, due to noise, etc, the projection to up-might give inconsistent values for some projected segments, thus creating uncertainty about their true values in these positions. Moreover, the projection may leave some 3D points or regions as "holes", since some regions which are visible in some of the original inputs are hidden (or equivalently occluded/concealed/covered) in some others. Such regions are depicted in FIG. 4. The holes are usually located along the borders of objects and, in general, the further the original viewpoint is, the more holes in the virtual viewpoint will be visible.

According to embodiments of the present invention, the next step is to determine 1102 a value associated with each projected view regarding the 3D component and to detect 1103 consistency between the projected views regarding the 3D component based on the determined value as shown in FIG. 10. The purpose is to improve the consistency between various projected views. Thus it is necessary to find a mechanism to make the different projected views agree with each other, i.e. to be consistent. In doing that and for each segment k of K segments, which may be a single pixel or groups of pixels, regular square or rectangular blocks, irregular areas such as superpixels, foreground/background objects, and in each of the projected views a distance matrix $D=\{D_{ij}^k\}$, is defined where:

$$D_{ij}^k = F(b_i^k, b_j^k),$$

where F denotes the distance function between the k-th block in view i and j ($b_i$ and $b_j$) respectively. If the k-th block corresponds to single pixels, $b_i$ and $b_j$ are represented as scalars (pixel intensities; for example grayscale values, RGB, etc), while in all the other cases they have a vector form (that is, if block based segmentation is used then the k-th block will be converted into a vector before being used in the above metric). Hence the determined value in step 1102 may be $b_i$ and $b_j$. The distance function F should fulfill the properties of a metric e.g. non-negativity, identity of indiscernible, symmetry and the triangular inequality. Therefore the distance function F is symmetric. An example of a distance function F is the Euclidean distance. The distance function F may also be a function in a different domain like the frequency domain. For example, let's consider DCT (Discrete cosine transform), DST (Discrete sine transform), wavelet or any other domain. In that case the original values are transformed into the new domain and then the function F is applied on the transformed projected views.

It should be noted here that, since the distance function F is symmetric, then the matrix D is symmetric as well, and therefore only its upper triangular part needs to be considered. Once all the elements of D are calculated, we need to check how consistent/inconsistent are the various segments between $p_1, \ldots, p_N$.

Figure 5:
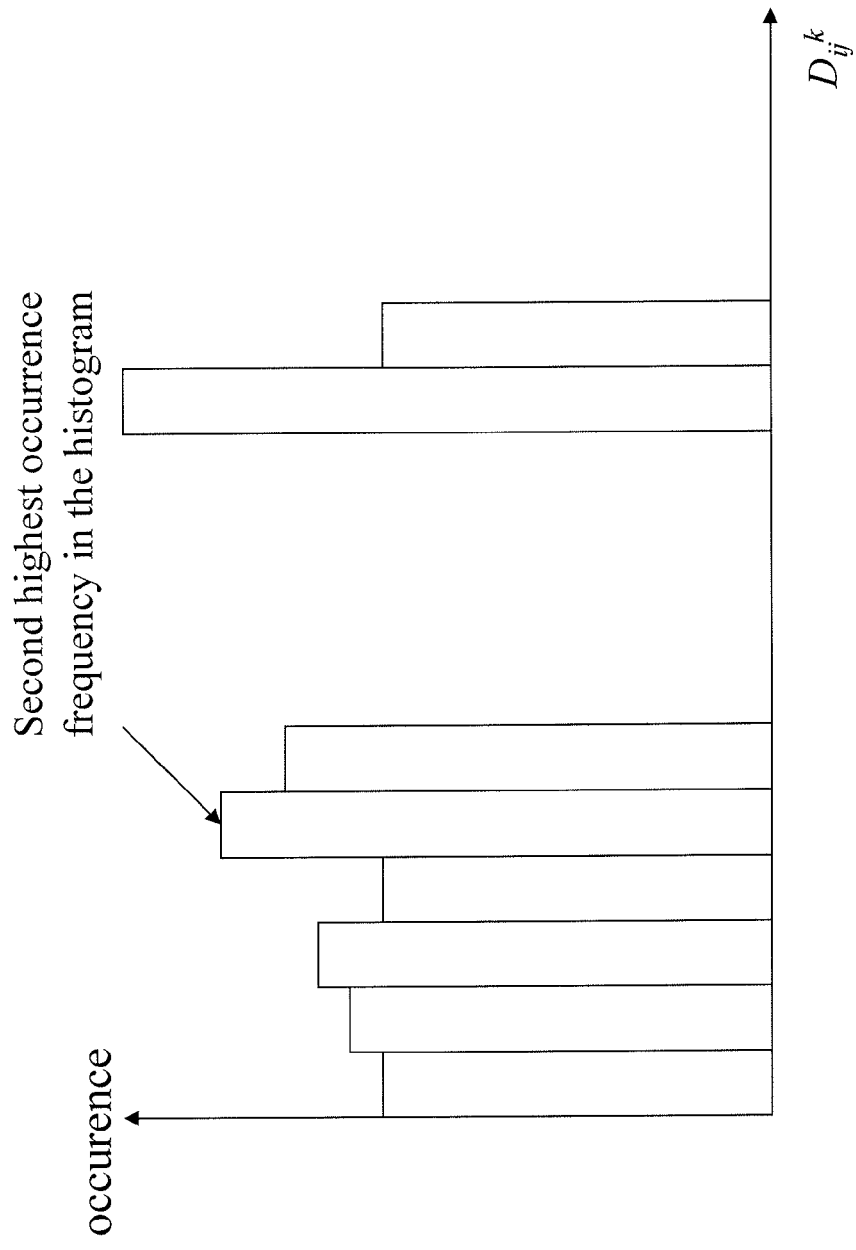
FIG. 5 illustrates selection of threshold values based on histogram statistics according to embodiments of the present invention.

The values $D_{ij}^k$ in D are compared with threshold values to evaluate whether there is consistency between different projected views. These values can either be constant or time varying scalars or matrices. In the case of scalars, the threshold can be obtained as the weighted sum of the mean and variance calculated for all the possible distances over all the pixels in a frame. Threshold may also be decided from the histogram of all the possible distance values within a frame—for example, the value that has the second highest frequency of occurrence may be used etc. This is illustrated in FIG. 5. An example of a time varying threshold is the case where motion information (temporal domain) provides information that there are rapid scene changes. In that case the human eye loses its ability to track temporal inconsistencies. Therefore the threshold to be used to check for consistency in scenes with rapid scene changes can be different from a threshold to be used for a static scene.

For each k-th block, a matrix of thresholds can be defined according to $$T^k = \{T_{ij}^k; \forall i,j \in \{1,2,\ldots,N\}\}.$$

The k-th matrix allows adapted values for the k-th block of a frame, etc. By using a matrix form, the spatial properties and/or constraints that capture the relationship between the neighboring views are taken into account. An example in that case would be smooth background vs. highly textured areas or areas close to objects borders. In such a case it is obvious that different threshold values need to be used and the most natural way to go is to use a threshold matrix or mask.

When the threshold(s) is (are) applied, the projections $p_i$ and $p_j$ are considered to be consistent in a specific segment k if $D_{ij}^k \leq T_{ij}^k$.

It should be noted here that the holes created during projection are not considered in the consistency check. That means that for each segment, only the inputs that are hole-free are considered as inputs for the distance matrix calculation and the subsequent steps.

Figure 6:
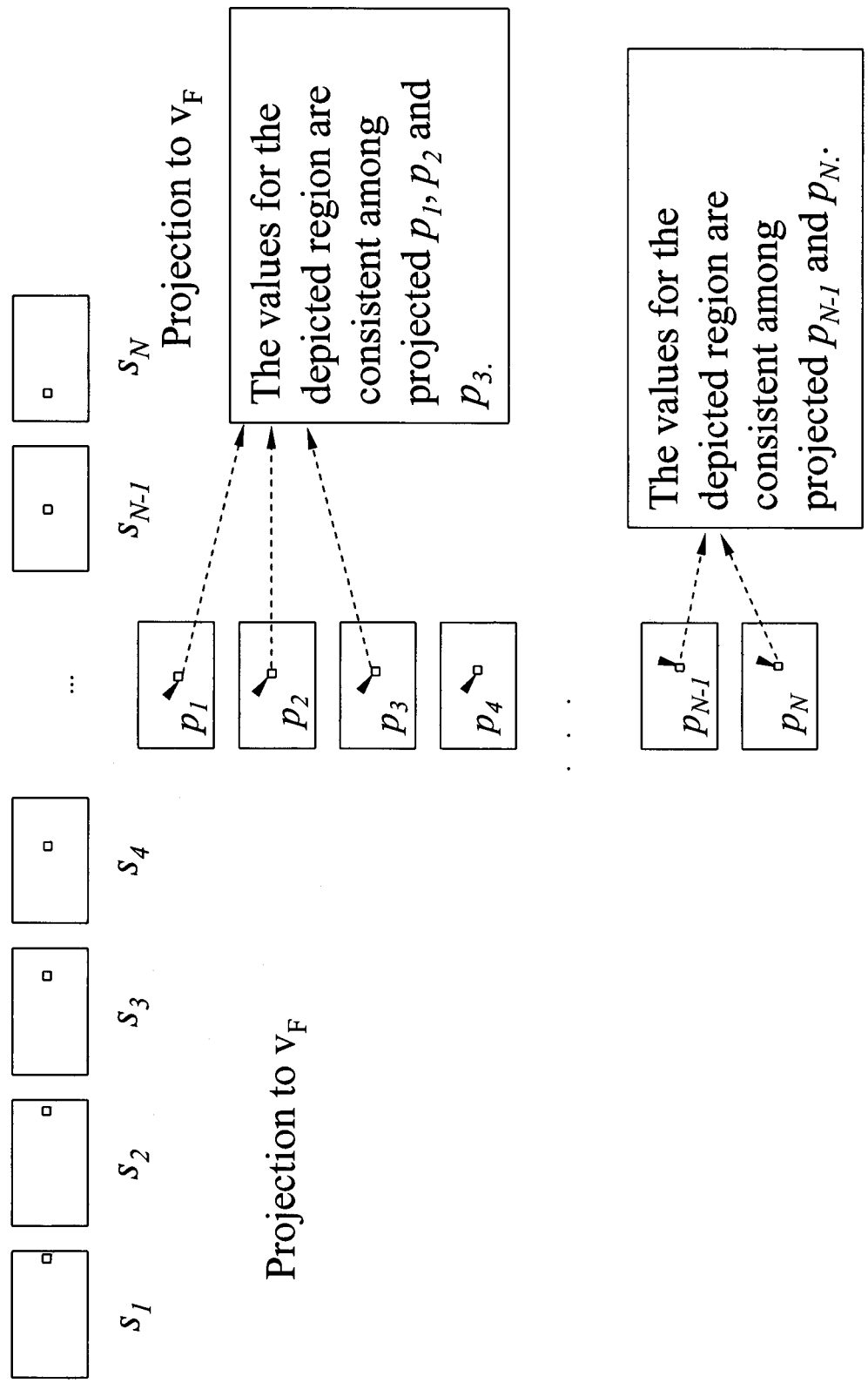
FIG. 6 shows a consistency check among multiple 3D scene components according to embodiments of the present invention.

The consistency check may give various outcomes. For example, multiple segment combinations may be pair-wise consistent, or some M-tuples are consistent with each other whereas some other P- or Q-tuples are consistent, where $M \leq N$ and $Q \leq N$. Accordingly, FIG. 6 shows a consistency check among multiple 3D scene components. In this example, the projection $p_1$, $p_2$ and $p_3$ are consistent, and the projections $p_{N-1}$ and $p_N$ are separately consistent. If the projections $p_1, \ldots, p_N$ are used for improving their own representation (e.g., $s_1, \ldots, s_N$ are textures which have to be improved), then it is possible to correct all the projections $p_1, \ldots, p_N$ by using the consistency value which is further explained below. On the other hand, if $p_1, \ldots, p_N$ are the projected depth maps and if they are e.g., used to improve the texture, the calculated consistent depth value and the corresponding consistency information for the projected views $p_1, \ldots, p_N$ can help to improve, for example, the projected texture information.

Thus the detecting step 1103 may further comprise defining for each segment for each projected view a distance of a distance matrix indicative of a distance between two projected views for one segment, wherein a threshold matrix is defined based on said distances of the distance matrix and values of the distance matrix are compared with the corresponding thresholds of the threshold matrix to determine consistency.

Hence, the next step 1104 is to define a consistency value. As indicated above, this consistency value can be used to replace 1105 the determined value associated with each projected view regarding the 3D component as shown in the flowchart of FIG. 10. It should be noted that the determined value may be replaced with the determined consistency value on at least one of the three projected 3D components. The determined value on all projected 3D components may not be replaced under various conditions such as disocclusion areas, inconsistency between the depth values among maps, etc.

Furthermore, the consistency value can also be used to update the 3D component of the original observation by backward warping.

A set of rules R can be applied when determining the consistency value. For example, a rule can be to simply use the average or the median of the values on the majority of the consistent projections as the consistency value. Or, if e.g. P projections agree on one value, and Q≤P on another one, it is possible to decide on the value that Q projections provide, if they have smaller distances to zero than to the threshold. Alternatively, it is possible to choose the value which gives the smallest distance, regardless of how many projected signals are consistent with respect to that value. There should also be a rule for the case when the consistency check returns an empty set. In that case it is possible, for example, to choose the average of all the segment values, or it may even be left unassigned and decided on in a subsequent step.

Once the rule has been applied to replace 1105 the determined value associated with each projected view regarding the 3D component with the consistency value, a better quality representation is obtained at the virtual viewpoint for the $p_1, \ldots, p_N$. If there still are unassigned values from previous steps, values can be assigned by e.g., taking the correlation with the spatial neighborhood into account. The obtained representation may further be post-processed, in order to e.g., reduce the noise. Now an improved 3D representation $p_F$ is obtained.

As stated above, the 3D components are according to embodiments of the present invention depth information. It should however be noted that the scope of the embodiments also comprise disparity maps as a 3D component. Another example of a 3D component is a texture map if illumination conditions are uniform or known. In this case the illumination conditions need to be compensated for.

Figure 7:
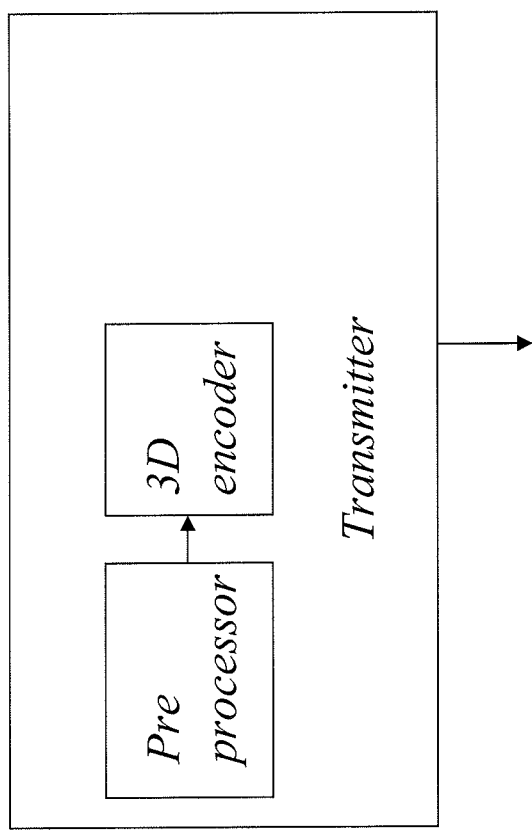
FIGS. 7 and 8 exemplify schematically different implementations according to embodiments of the present invention.

The method of the embodiments as illustrated in FIG. 10 can be applied at the transmitter side, as a postprocessing step after multiview texture capturing or depth estimation as illustrated in FIG. 7. In this way the multiple 3D scene representations are aligned before encoding, which typically results in increased coding efficiency. Accordingly, the method according to the embodiments of the present invention may be implemented in a pre-processor in a transmitter as illustrated in FIG. 7. Multiview texture, depth maps, occlusions etc. are inputs to a 3D encoder in FIG. 7.

Figure 8:
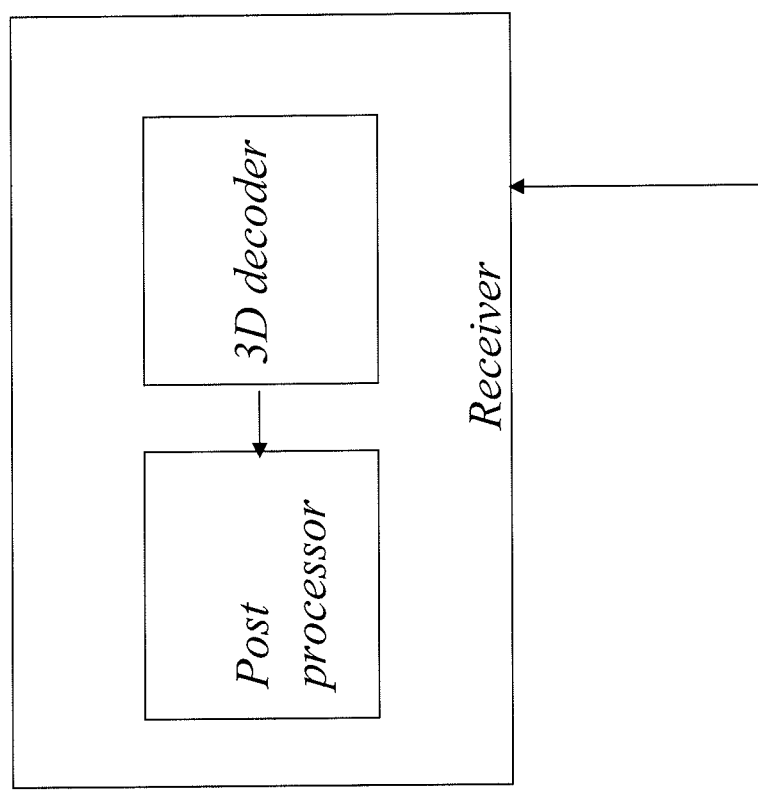

Alternatively, only the representation obtained after aligning can be encoded and transmitted. The method according to the embodiments can also, or instead, be applied at the receiver side as well after the decoding step in order to align decoded components and fix possible coding artifacts. Hence, the method according to the embodiments of the present invention may be implemented in a post-processor in a receiver as illustrated in FIG. 8.

Figure 9:
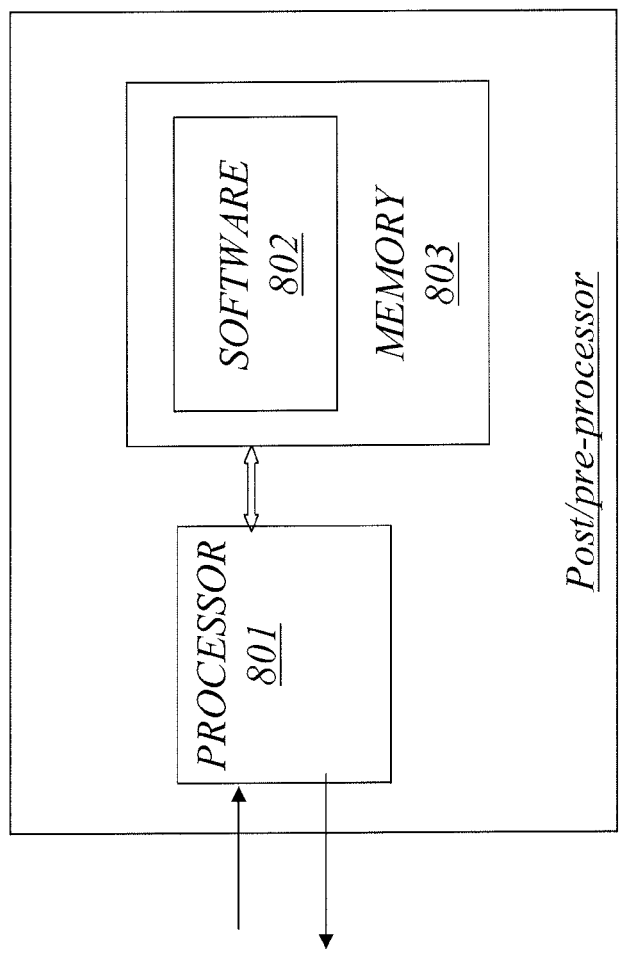
FIG. 9 illustrates schematically a post/pre-processor according to embodiments of the present invention.

Turning now to FIG. 9, the post-processor and pre-processors comprise a processor 801 configured to project to a predefined view ($v_F$) one 3D component of the 3D scene to be represented, captured at at least three different views ($v_1$, $v_2$, $v_3$). The processor 801 is further configured to determine a value associated with each projected view regarding the 3D component. These values are referred to as $b_i$ and $b_j$. The processor 801 is also configured to detect consistency between the projected views regarding the 3D component and to determine a consistency value regarding the 3D component based on the determined values associated with the respective projected view. Moreover, the processor 801 is configured to replace the determined value with the determined consistency value on at least one of the three projected 3D components.

According to an embodiment, the processor is further configured to define for each segment for each projected view a distance of a distance matrix indicative of a distance between two projected views for one segment, wherein a threshold matrix is defined based on said distances of the distance matrix and values of the distance matrix are compared with the corresponding thresholds of the threshold matrix to determine consistency. It should be noted that the distance and the threshold may comprise of scalar values which implies that some elements of the matrices are empty.

The post-processor may comprise of one or more processing units.

Moreover, the post/pre-processor of the receiver and transmitter may be realized by computer software 802. The functionalities within the post-processor can be implemented by a processor 801 connected to a memory 803 storing software code portions 802 as illustrated below. The processor runs the software code portions to achieve the functionalities for improving the 3D scene representation according to embodiments of the present invention of the post/pre-processor.

The following applications are envisaged for the embodiments of the present invention:

The improved 3D scene component $p_F$ ensures a better and more accurate 3D model of a scene. This also implies improved quality of synthesized views.

The improved 3D scene component $p_F$ can be warped backwards to the original viewpoint positions, leading to improved quality and/or more consistent inputs $s_1$-$s_N$. The improvements in the original inputs stem from the fact that the consistency checks and the rules that were applied afterwards removed a lot of the special and temporal inconsistencies from all available views. As described above for the case of multiview video coding, the multiple inputs are usually jointly encoded, by exploiting both the temporal and spatial consistency between them. Since the multiple inputs are now more consistent, the correlation (similarity)

between the views increases and therefore less bits are needed to encode the difference. This is also referred to as a higher coding efficiency.

Multiple depth/disparity maps can be used to improve the quality of depth/disparity maps themselves, but can also be used to improve the quality of texture. This can happen, if for some reason, the quality of texture is worse than the quality of other components, e.g., in case of unknown illumination conditions. Or, alternatively, the consistency between the depth maps can be utilized for view synthesis, where only textures with the corresponding consistent depth maps are considered when synthesizing a view. In the same way as above, multiple textures can be used to improve existing depth/disparity/occlusion information. This is feasible if the illumination conditions are known and if they can be considered in the projection/warping process.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a processor for representing a 3D scene, comprising:
    projecting to a predefined view ($v_F$) one 3D component of the 3D scene to be represented, captured at at least three different views ($v_1$, $v_2$, $v_3$), wherein the 3D component is related to depth information,
    determining a value associated with each projected view regarding the 3D component,
    detecting consistency among the projected views regarding the 3D component by defining for each segment for each projected view a distance of a distance matrix indicative of a distance between two projected views for one segment, wherein a threshold matrix is defined based on said distances of the distance matrix,
    determining a consistency value regarding the 3D component based on the determined values associated with the respective projected view, wherein values of the distance matrix are compared with the corresponding thresholds of the threshold matrix to determine consistency, and
    replacing the determined value with the determined consistency value on at least one of the projected views regarding the 3D component.

2. The method according to claim 1, wherein the consistency value of the projected views is an average value of the determined values associated with each projected view regarding the 3D component.

3. The method according to claim 1, wherein the predefined view ($v_F$) corresponds to one of the different views where the 3D component is captured.

4. The method according to claim 1, wherein the threshold matrix is dependent of spatial or temporal characteristics of the segment.

5. The method according to claim 1, wherein the consistency value of one 3D component is used to improve at least another 3D component.

6. A processor for representing a 3D scene, the processor configured to:
    project to a predefined view ($v_F$) one 3D component of the 3D scene to be represented, captured at least three different views ($v_1$, $v_2$, $v_3$), wherein the 3D component is related to depth information,
    determine a value associated with each projected view regarding the 3D component,
    detect consistency among the projected views regarding the 3D component by defining for each segment for each projected view a distance of a distance matrix indicative of a distance between two projected views for one segment, wherein a threshold matrix is defined based on said distances of the distance matrix, and
    determine a consistency value regarding the 3D component based on the determined values associated with the respective projected view, wherein values of the distance matrix are compared with the corresponding thresholds of the threshold matrix to determine consistency and to replace the determined value with the determined consistency value on at least one of the projected view regarding the 3D component.

7. The processor according to claim 6, wherein the consistency value of the projected views is an average value of the determined values associated with each projected view regarding the 3D component.

8. The processor according to claim 6, wherein the predefined view ($v_F$) corresponds to one of the different views where the 3D component is captured.

9. The processor according to claim 6, wherein the threshold matrix is dependent of spatial or temporal characteristics of the segment.

10. The processor according to claim 6, further configured to use the consistency value of one 3D component to improve at least another 3D component.

11. The method according to claim 1, wherein the threshold matrix is defined in accordance with a histogram of each of the distances in the distance matrix.

12. The method according to claim 1, wherein the 3D component further includes an occlusion map.

13. The method according to claim 12, wherein each distance in the distance matrix is determined in accordance with the depth information and occlusion map.

14. The method according to claim 12, wherein the 3D component further includes a texture map.

15. The method according to claim 14, wherein the each distance in the distance matrix is determined in accordance with the depth information, occlusion map, and texture map.

* * * * *